US009906313B2

United States Patent
Coffey (10) Patent No.: US 9,906,313 B2
(45) Date of Patent: Feb. 27, 2018

(54) OPTICALLY POWERED MEDIA CONVERTER

(71) Applicant: CommScope Technologies LLC, Hickory, NC (US)

(72) Inventor: Joseph C. Coffey, Burnsville, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/218,929

(22) Filed: Jul. 25, 2016

(65) Prior Publication Data

US 2017/0054514 A1    Feb. 23, 2017

Related U.S. Application Data

(63) Continuation of application No. 14/206,986, filed on Mar. 12, 2014, now Pat. No. 9,401,767.

(Continued)

(51) Int. Cl.
*H04B 10/00*     (2013.01)
*H04B 10/80*     (2013.01)
*H04B 10/2575*   (2013.01)
*H04B 10/516*    (2013.01)
*H04B 10/69*     (2013.01)

(52) U.S. Cl.
CPC ....... *H04B 10/807* (2013.01); *H04B 10/2575* (2013.01); *H04B 10/516* (2013.01); *H04B 10/69* (2013.01)

(58) Field of Classification Search
CPC .................................................. H04B 10/807
See application file for complete search history.

(56) References Cited

U.S. PATENT DOCUMENTS 3,963,920 A * 6/1976 Palmer ................... F25B 21/02
                                                        250/214.1
4,326,298 A * 4/1982 Fromm ................ H04B 10/807
                                                         398/108

(Continued)

FOREIGN PATENT DOCUMENTS

EP    1 905 176 B1    10/2010
JP    8-251578         9/1996

(Continued)

OTHER PUBLICATIONS

Banwell, T. et al., "Powering the Fiber Loop Optically—A Cost Analysis," *Journal of Lightwave Technology*, vol. 11, No. 3, pp. 481-494 (Mar. 1993).

(Continued)

*Primary Examiner* — Danny Leung
(74) *Attorney, Agent, or Firm* — Merchant & Gould P.C.

(57) ABSTRACT

An optically powered media conversion device for performing optical to electrical conversion is disclosed. The conversion device includes at least one optical coupler for receiving at least one optical signal comprising at least one wavelength, wherein the at least one optical coupler extracts energy from the at least one optical signal, and at least one detector for extracting data from the at least one optical signal and converting the optical signal to an electrical signal using a photovoltaic process. The conversion device further includes a transmitter for converting an electrical signal to an optical signal and transmitting the optical signal to a first device.

13 Claims, 6 Drawing Sheets

Related U.S. Application Data (60) Provisional application No. 61/778,109, filed on Mar. 12, 2013.

(56) References Cited

U.S. PATENT DOCUMENTS

| | | | |
|---|---|---|---|
| 9,401,767 B2 | 7/2016 | Coffey | |
| 2005/0061361 A1* | 3/2005 | Ochi | H01L 31/02021 |
| | | | 136/252 |
| 2005/0200310 A1* | 9/2005 | Brown | G09G 3/3696 |
| | | | 315/291 |
| 2007/0058666 A1* | 3/2007 | Pratt | H04L 12/10 |
| | | | 370/463 |
| 2007/0103311 A1* | 5/2007 | Kippelen | G06K 19/0723 |
| | | | 340/572.8 |
| 2007/0212596 A1* | 9/2007 | Nebrigic | H01M 10/44 |
| | | | 429/61 |
| 2008/0277565 A1 | 11/2008 | Bookbinder et al. | |
| 2009/0038794 A1* | 2/2009 | Yamate | E21B 47/123 |
| | | | 166/254.2 |
| 2009/0049319 A1* | 2/2009 | Meynants | H02M 3/07 |
| | | | 713/322 |
| 2011/0128725 A1* | 6/2011 | Shew | F21S 8/02 |
| | | | 362/183 |
| 2011/0278440 A1* | 11/2011 | Chan | H04B 10/807 |
| | | | 250/227.11 |
| 2012/0128371 A1* | 5/2012 | Einicke | H04B 10/807 |
| | | | 398/141 |
| 2013/0175862 A1* | 7/2013 | Kelly | H02J 1/14 |
| | | | 307/24 |
| 2013/0276868 A1* | 10/2013 | Huemer | F24J 2/04 |
| | | | 136/248 |
| 2013/0328416 A1* | 12/2013 | Whitworth | H02J 50/30 |
| | | | 307/149 |
| 2014/0268936 A1* | 9/2014 | Lu | H02M 1/36 |
| | | | 363/49 |
| 2014/0270789 A1* | 9/2014 | Coffey | H04B 10/807 |
| | | | 398/116 |
| 2017/0054514 A1* | 2/2017 | Coffey | H04B 10/807 |

FOREIGN PATENT DOCUMENTS

| | | |
|---|---|---|
| KR | 10-2008-0112770 | 12/2008 |
| WO | WO 2007/021728 A1 | 2/2007 |
| WO | WO 2009/044948 A1 | 4/2009 |
| WO | WO 2011/091234 A1 | 7/2011 |

OTHER PUBLICATIONS

European Search Report for Application No. 14778511.7 dated Sep. 30, 2016.
International Search Report and Written Opinion for PCT/US2014/024883 dated Jul. 17, 2014.

* cited by examiner

FIGURE 6

OPTICALLY POWERED MEDIA CONVERTER

CROSS-REFERENCE TO RELATED APPLICATIONS

This application is a continuation of application Ser. No. 14/206,986, filed Mar. 12, 2014, which application claims priority from U.S. Provisional Patent Application No. 61/778,109, filed Mar. 12, 2013, which applications are incorporated herein by reference in their entirety.

TECHNICAL FIELD

The present disclosure relates generally to management of optical signal distribution. In particular, the present application relates to an optically powered media converter.

BACKGROUND

Applications using fiber optics require the use of external media converters to convert optical signals to electrical signals and to convert electrical signals to optical signals. These media converters require power to perform this conversion, and often receive power from external devices such as a computer, keyboard, USB port, or an AC-DC power supply that is plugged into a wall outlet. However, using an AC-DC power supply can create problems by introducing electromagnetic interference to the optical signal. Additionally, media conversion devices may be placed in locations far from these external power sources, thereby making it difficult or impractical to route power to such locations.

SUMMARY

In general terms, this disclosure is directed to optically powered media converters. In one possible configuration and by non-limiting example, optically powered media converters are powered by extracting energy from an optical signal and an electrical signal.

One aspect of the present disclosure relates to a method of providing power to a remote optical conversion device the method comprising receiving an optical signal at an optical interface of an electrical to optical interface device, wherein the optical signal is delivered to the optical interface via a fiber optical cable and includes at least one wavelength. The method further comprises extracting energy from the optical signal and developing electrical current from the energy using a photodetector, wherein the electrical current is developed through a photovoltaic process. The method further comprises extracting information from the optical signal and transmitting information via an electrical interface of the electrical to optical interface device.

Another aspect of the present disclosure relates to a system for providing power to a remote conversion device, wherein the system comprises a first and a second device, wherein the first device includes an optical source and wherein the second device includes electrical data. The system further comprises a media conversion device and at least one optical fiber cable having a first end and a second end, wherein the first end is connected to the first device and the second end is connected to the media conversion device. Additionally, the system comprises at least one electrical conductor cable having a first end and a second end, wherein the first end is connected to the second device and the second end is connected to the media conversion device.

Another aspect of the present disclosure relates to an optically powered media conversion device for performing optical to electrical conversion, wherein the optically powered media conversion device comprises at least one optical coupler for receiving at least one optical signal comprising at least one wavelength, wherein the at least one optical coupler extracts energy from the at least one optical signal. The optically powered media conversion device further comprises at least one detector for extracting data from the at least one optical signal and converting the optical signal to an electrical signal using a photovoltaic process. Additionally, the optically powered media conversion device comprises a transmitter for converting an electrical signal to an optical signal and transmitting the optical signal to a first device.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure relates to an optically powered media converter wherein the media converter is a standalone device located externally to the communicating devices. The present disclosure describes several embodiments for providing optical power to the remotely located media converter. In each embodiment of the present disclosure, the externally located media converter extracts optical energy from an inbound optical signal, which eliminates the need for an independent electrical power source. In some examples described herein, a media converter can include a device with a receiver used to detect and convert optical signals to signals of a different format (e.g., electrical signals) and optionally a transmitter used to convert signals of that different format to optical signals.

In some embodiments, the externally located media converter requires little power because it does not include an optical source such as a fiber optic grade light emitting diode (LED), a vertical cavity semiconductor laser (VCSEL), a Fabry-Pérot laser, or a distributed feedback laser. In such an embodiment, the media converter modulates a previously received optical signal with an electrical signal including data desired for optical transmission. In other embodiments, the externally located media converter includes an optical source such as low lasing threshold current VCSEL that is powered by a charge pump within the media converter. In such an embodiment, the media converter may use anywhere between 1 to 5 mW of power.

Figure 1:
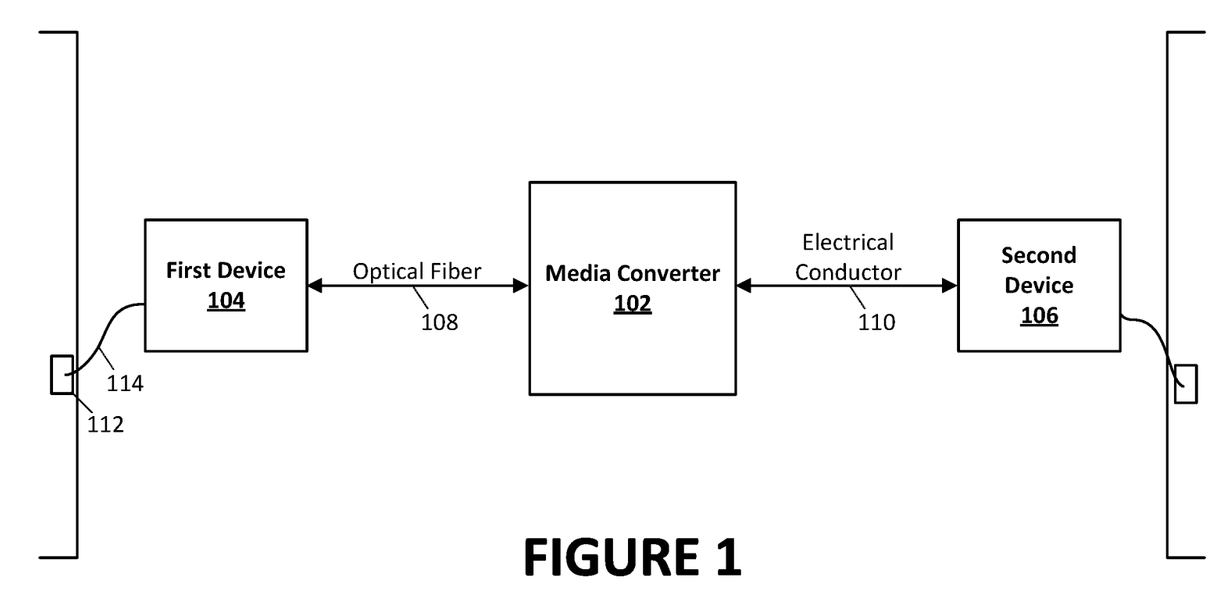
FIG. 1 is a schematic block diagram of a system using an optically powered media converter and sensor in accordance with the present disclosure.

Referring now to FIG. 1, a schematic block diagram of a system using an optically powered media converter and sensor in accordance with the present disclosure is shown. In this example, the system 100 includes a media converter 102, a first device 104, a second device 106, at least one optical fiber 108, and at least one electrical conductor 110. In this example, the first device contains an internal AC-DC power supply (not shown) that is powered by an external power supply 112 using a power cable 114. The first device also includes an optical transmitter capable of generating an optical signal. Examples of optical transmitters useable in the first device include LEDs, Fabry-Pérot lasers, distributed feedback lasers, and VCSELs. In this embodiment, the first device 104 transmits the generated optical signal including information and sufficient optical power over the optical fiber 108, wherein the optical signal including information is converted to an electrical signal and optical energy is extracted by the externally located media converter 102. The media converter 102 then transmits the electrical signal over an electrical conductor 110 to the second device 106. Types of electrical conductors that can be used are copper cable or unshielded twisted pair. Alternatively, other types of conductive cable is used. Example embodiments of the media converter 102 are described in more detail with reference to FIGS. 2-6.

Figure 2:
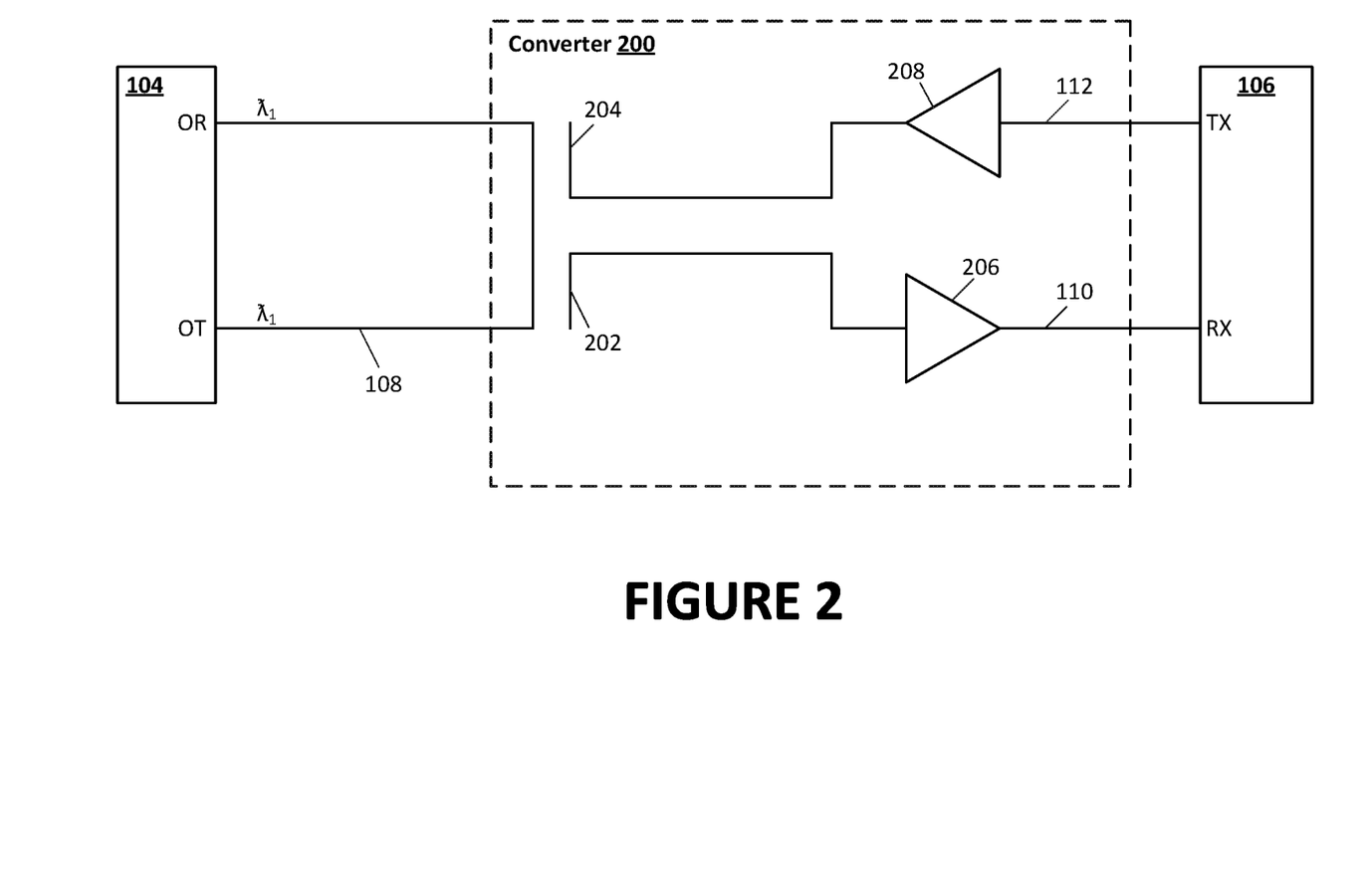
FIG. 2 is an embodiment of an optically powered media converter shown in FIG. 1.

Referring now to FIG. 2, an example embodiment of an optically powered media converter 200 is shown. In various embodiments, the optically powered media converter 200 can be used in an optical-electrical communication arrangement, such as in the system 100 of FIG. 1 (e.g., as an optically powered media converter 102). The media converter 102 includes first and second optical couplers 202 and 204, respectively, a photodetector 206, and a transmitter 208. In this embodiment, the first device 104 generates an optical signal with a single wavelength and with sufficient power to drive the receive function of the media converter 102. The first coupler 202 within the media converter 102 extracts energy from the optical signal and delivers the energy to drive the photodetector 206. Using the power from the optical signal, the photodetector 206 extracts data from the optical signal and converts the optical signal into an electrical signal using a photovoltaic process. In some embodiments, an LED is used as a photodetector. The photodetector then transmits the electrical signal to the second device 106, located externally to the media converter 200, over the electrical conductor 110.

The transmitter 208 part of the media converter 102 accepts electrical signals from the second device 106 through the electrical conductor 112 and extracts sufficient energy from the electrical conductor 112 to drive a switch and a modulator that is used to modulate the residual optical signal with the electrical signal. Protocols such as Ethernet drive the electrical conductor 112 with sufficient energy to drive a switch and a modulator. In some embodiments, a microelectromechanical systems (MEMS) switch is used. In some embodiments, a cavity or an interferometer is used as a modulator. The modulated optical signal is then coupled onto the optical fiber 108 using the second coupler 204 and transmitted back to the first device 104. Because the optical fiber 108 transmits or receives one optical signal at a time, this first embodiment of the present disclosure operates as a half-duplex system, or utilizes a polarization scheme to enable duplex operation.

Figure 3:
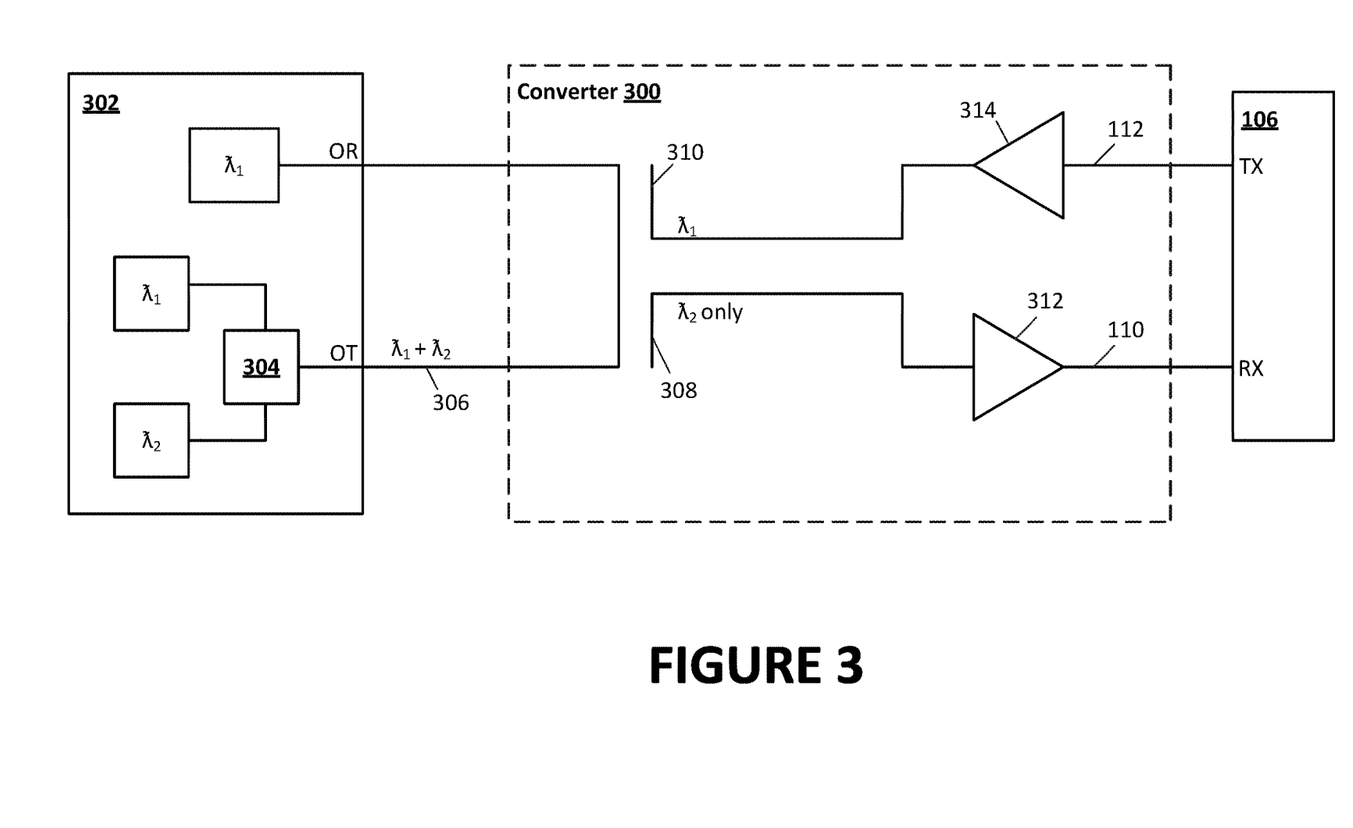
FIG. 3 is an alternative embodiment of an optically powered media converter shown in FIG. 1.

Referring now to FIG. 3, an example of an optically powered media converter 300 is shown. In various embodiments, the optically powered media converter 300 can be used in an optical-electrical communication arrangement, such as in the system 100 of FIG. 1 (e.g., as an optically powered media converter 102). The media converter 300 includes first and second optical couplers 308 and 310, respectively, a photodetector 312, and a transmitter 314. In this embodiment, the first device 302 generates a first and a second optical signal at different wavelengths that are combined using a wave division multiplexer 304 and transmitted over the optical fiber 306. The first coupler 308 within the media converter 300 extracts energy from the second optical signal and delivers the energy to drive the photodetector 312. Using the generated power, the photodetector 312 extracts data from the second optical signal and converts the second optical signal into an electrical signal using a photovoltaic process. The photodetector 312 then transmits the electrical signal to the second device 106, located externally to the media converter 300, over the electrical conductor 110.

The transmitter 314 part of the media converter 300 accepts electrical signals from the second device 106 through the electrical conductor 112 and extracts sufficient energy from the electrical conductor 112 to drive a switch and a modulator that is used to modulate the first optical signal with the electrical signal. Protocols such as Ethernet drive the electrical conductor 112 with sufficient energy to drive a switch and a modulator. In some embodiments, a MEMS switch is used. In some embodiments, a cavity or an interferometer is used as a modulator. The first optical signal is modulated with the electrical signal and is then coupled onto the optical fiber 306 using the second coupler 310 and transmitted back to the first device 302. Because the optical fiber 306 can simultaneously transmit and receive two optical signals, this embodiment of the present disclosure operates as a full-duplex system.

Figure 4:
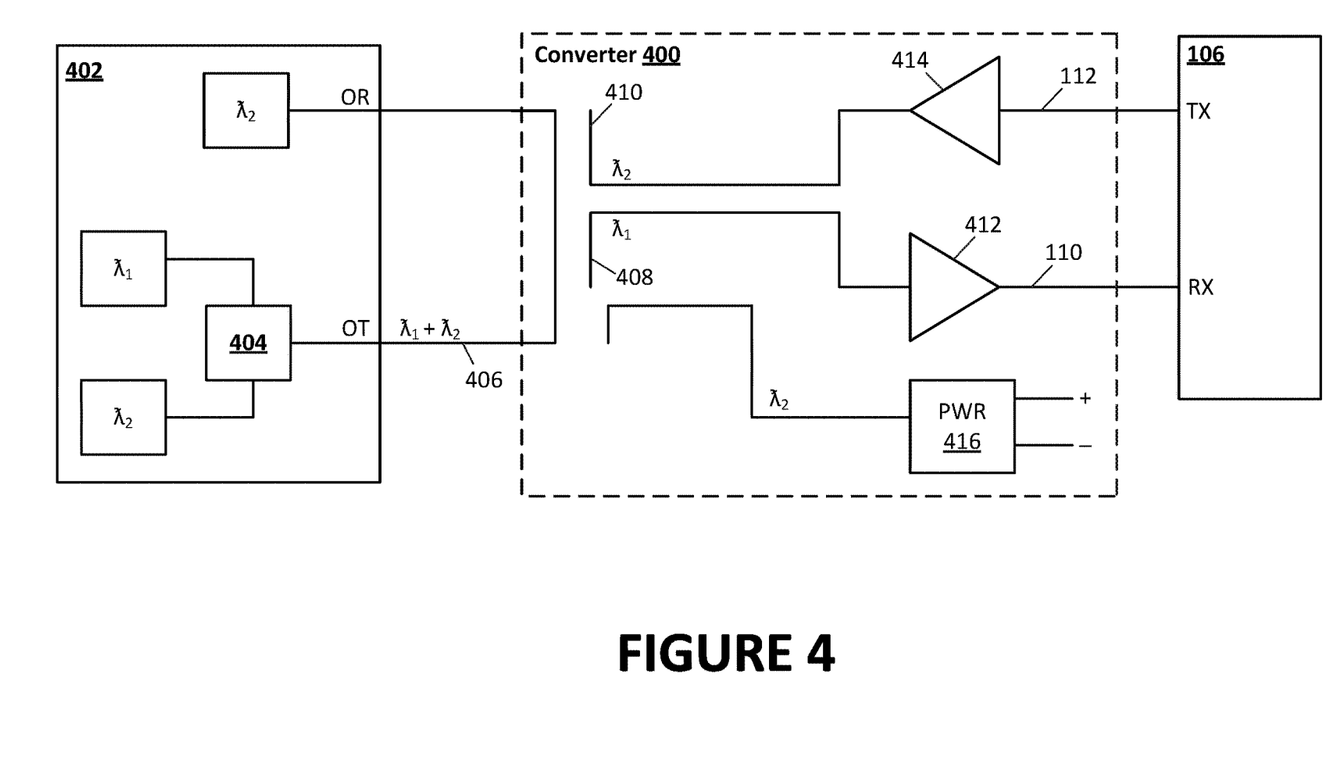
FIG. 4 is an alternative embodiment of an optically powered media converter shown in FIG. 1.

Referring now to FIG. 4, an example of an optically powered media converter 400 is shown. In various embodiments, the optically powered media converter 400 can be used in an optical-electrical communication arrangement, such as in the system 100 of FIG. 1 (e.g., as an optically powered media converter 102). The media converter 400 includes first and second optical couplers 408 and 410, respectively, a photodetector 412, a transmitter 414, and a power converter 416. In this embodiment, the first device 402 generates a first and a second optical signal at different wavelengths that are combined using a wave division multiplexer 404 and transmitted over the optical fiber 406. The first coupler 408 within the media converter 400 extracts part of the energy from the second wavelength and delivers the energy to a power converter 416 that uses the energy to develop electrical current using a photovoltaic process. This electrical power is used by the entire system.

Additionally, the first coupler 408 extracts the energy from the first wavelength and delivers it to power the photodetector 412. The photodetector 412 then extracts data from the first wavelength and converts the optical signal into an electrical signal using a photovoltaic process. The photodetector 412 then transmits the electrical signal to the second device 106, located externally to the media converter 400, over the electrical conductor 110.

The transmitter 414 part of the media converter 400 accepts electrical signals from the second device 106 through the electrical conductor 112 and power generated by the power converter 416 to drive a switch and a modulator. In some embodiments, a MEMS switch is used. In some embodiments, a cavity or an interferometer is used as a modulator. The second optical signal is modulated with the electrical signal and is then coupled onto the optical fiber 406 using the second coupler 410 and transmitted back to the first device 402. Because the optical fiber 406 can simultaneously transmit and receive two optical signals, this embodiment of the present disclosure operates as a full-duplex system.

Figure 5:
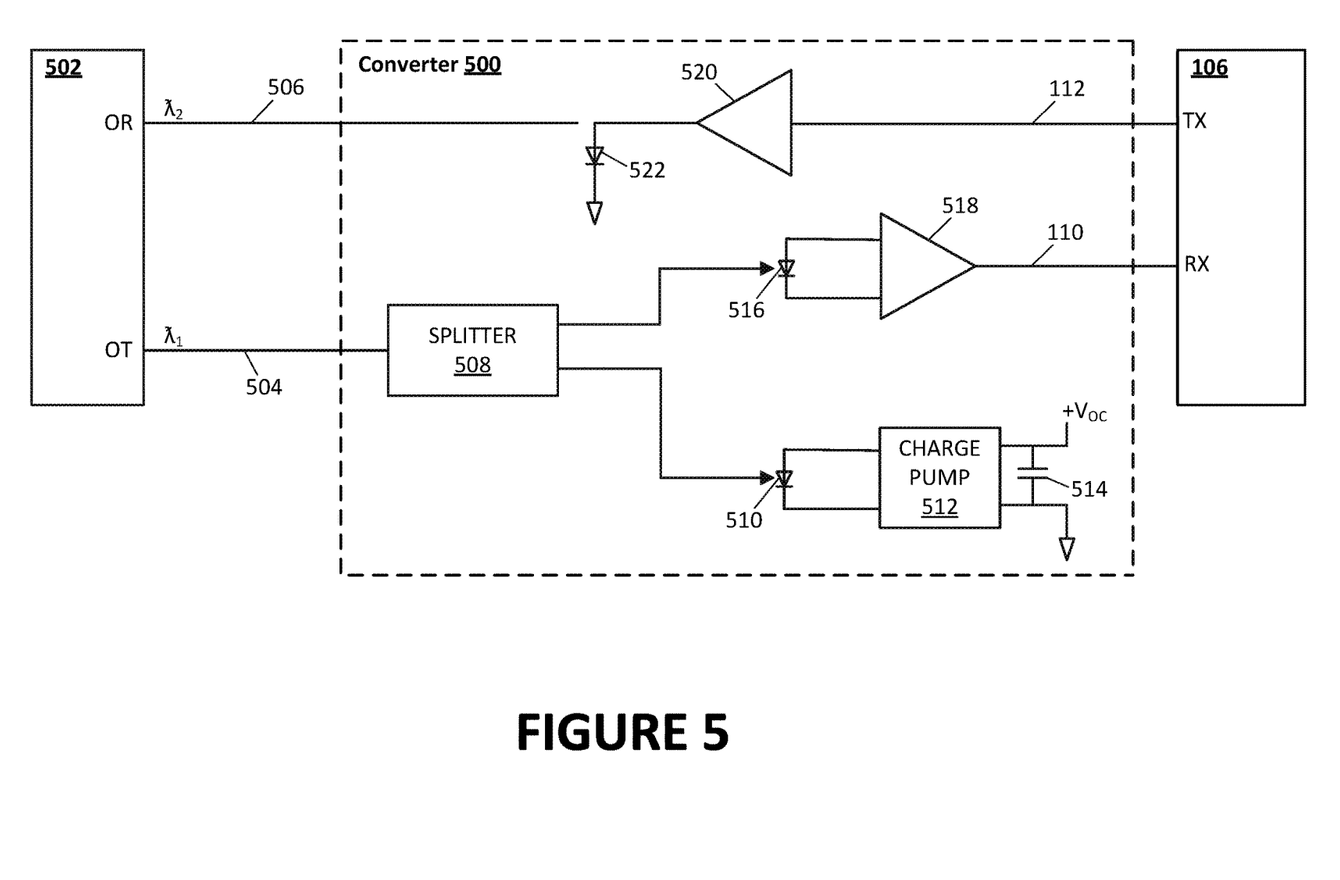
FIG. 5 is an alternative embodiment of an optically powered media converter, as shown in FIG. 1, with an embedded charge pump.

Referring now to FIG. 5, an example embodiment of an optically powered media converter 500 using discrete transmit and receive optical fibers 504 and 506, respectively, is shown. In various embodiments, the optically powered media converter 500 can be used in an optical-electrical communication arrangement, such as in the system 100 of FIG. 1 (e.g., as an optically powered media converter 102). The media converter 500 includes a splitter 508, a photovoltaic cell 510, a charge pump 512, a storage device 514, a PIN detector 516, a first driver 518, a second driver 520, and an optical transmitter 522. In this embodiment, the first device 502 transmits an optical signal containing power and data over the transmit optical fiber 504. The optical signal terminates at a splitter 508 in the media converter 500 wherein the splitter 508 divides part of the energy to a PIN detector 516 for data extraction and sends the remaining part to a photovoltaic cell 510 for power extraction. In some embodiments, the splitter 508 evenly divides the signal power between to the PIN detector 516 and the photovoltaic cell 510. In other embodiments, the splitter 508 divides the signal in other ratios wherein the higher side is used for power.

The PIN detector 516 is used to extract data from the first wavelength. The PIN detector 516 outputs the data as an electrical signal that is transmitted to the second device 106, located externally to the media converter 500, over the electrical conductor 110 using the first driver 518. In other embodiments, the electrical signal is transmitted to the second device 106 using a PHY device such as an Ethernet PHY chip.

As described above, the photovoltaic cell 510 receives a divided signal from the splitter 508 and extracts power therefrom. The photovoltaic cell 610 powers a charge pump 512 that generates a higher voltage than the incoming supply voltage using one or more capacitors. The charge pump 512 regulates the current supplied to the storage device 514 thereby enabling the storage device 514 to store energy that is then used by the media converter 500. In some embodiments, a super capacitor is used as the storage device 514. In other embodiments a battery is used. In some embodiments, the storage device 514 is factory pre-charged and in other embodiments, the storage device is not pre-charged.

The media converter 500 also sends an optical signal carrying data from an electrical signal generated by the second device 106 to the first device 104 over the receive optical fiber 506. In this embodiment, an optical signal is generated by an optical transmitter 522. Examples of an optical transmitter used by the media converter 500 are an LED, a Fabry-Pérot laser, a distributed feedback laser, or a VCSEL. In this embodiment, the optical transmitter 522 is driven by a driver 520 with the electrical signal transmitted from the second device 106 as the input signal. The generated optical signal including information from the electrical signal is then transmitted to the first device 502 over the receive optical fiber 506. Because the transmit and receive optical fibers 504 and 506, respectively, can simultaneously transmit and receive two optical signals, this embodiment of the present disclosure operates as a full-duplex communication system.

Figure 6:
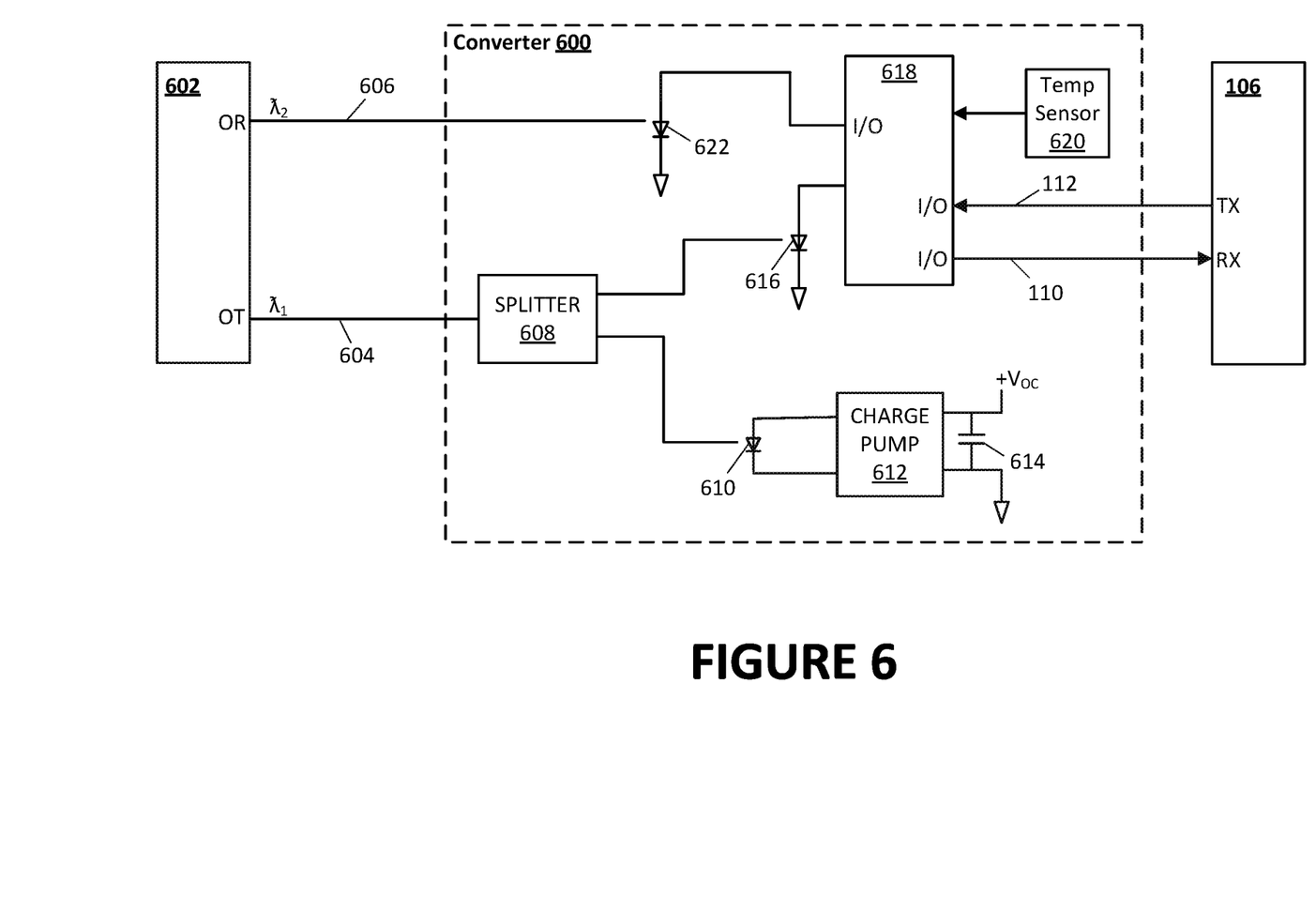
FIG. 6 is an embodiment of an optically powered media converter, as shown in FIG. 1, with an embedded charge pump, microcontroller, and a temperature sensor.

Referring now to FIG. 6, an example embodiment of an optically powered media converter 600 using discrete transmit and receive optical fibers 604 and 606, respectively, is shown. In various embodiments, the optically powered media converter 600 can be used in an optical-electrical communication arrangement, such as in the system 100 of FIG. 1 (e.g., as an optically powered media converter 102). The media converter 600 includes a splitter 608, a photovoltaic cell 610, a charge pump 612, a storage device 614, a PIN detector 616, a microcontroller 618, a temperature sensor 620, and an optical transmitter 622. In this embodiment, the first device 602 transmits an optical signal containing power and data over the transmit optical fiber 604. The optical signal terminates at a splitter 608 in the media converter 600 wherein the splitter 608 divides part of the energy to a PIN detector 616 for data extraction and sends the remaining part to a photovoltaic cell 610 for power extraction. In some embodiments, the splitter 608 evenly divides the signal power between to the PIN detector 616 and the photovoltaic cell 610. In other embodiments, the splitter 608 divides the signal in other ratios wherein the higher side is used for power.

The PIN detector 616 and built-in amplifiers in the microcontroller 618 extract data from the first wavelength. The microcontroller 618 outputs the data as an electrical signal on a general purpose input/output pin and transmits the electrical signal to the second device 106, located externally to the media converter 600, over the electrical conductor 110.

As described above, the photovoltaic cell 510 receives a divided optical signal from the splitter 508 and extracts power therefrom. The photovoltaic cell 610 powers a charge pump 612 that generates a higher voltage than the incoming supply voltage using one or more capacitors. The charge pump 612 regulates the current supplied to the storage device 614 thereby enabling the storage device 614 to store energy that is then used by the media converter 600. In some embodiments, a super capacitor is used as the storage device 614. In other embodiments a battery is used. In some embodiments, the storage device 614 is factory pre-charged and in other embodiments, the storage device is not pre-charged.

In this embodiment, the media converter 600 also sends an optical signal carrying data from an electrical signal generated by the second device 106 and temperature data generated by the temperature sensor 620 to the first device 602. In this embodiment, the microcontroller 618 receives data from the first device 106 and the embedded temperature sensor 620. Alternatively, the temperature sensor 620 is located externally to the media converter 600 in other embodiments. An optical transmitter 622 that is driven by the microcontroller 618 generates an optical signal. Examples of an optical transmitter 622 used by the media converter 600 are a VCSEL, an LED, a Fabry-Pérot laser, or a distributed feedback laser. In this embodiment, a VCSEL is used as the optical transmitter 622 due to its low lasing threshold current, allowing the microcontroller 618 to drive the VCSEL using a general purpose input/output pin. The generated optical signal is then transmitted to the first device 602 over the receive optical fiber 606. Because the transmit and receive optical fibers 604 and 606, respectively, can simultaneously transmit and receive two optical signals, this embodiment of the present disclosure operates as a full-duplex communication system.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. An optically powered media converter comprising:
   an optical receiver including an optical signal input connection, an optical data output connection, and an optical power output connection;
   a photovoltaic detector optically connected to the optical data output connection of the optical receiver and including an electrical data output;
   a PIN detector optically connected between the optical receiver and the photovoltaic detector
   a transmitter including an electrical signal connection and an optical data transmission output;
   a photovoltaic cell connected to the optical power output connection;
   a charge pump electrically connected to the photovoltaic cell; and
   an electrical energy storage device electrically connected to the charge pump.

2. The optically powered media converter of claim 1, wherein the transmitter is powered by the electrical energy storage device.

3. The optically powered media converter of claim 1, wherein the photovoltaic detector is powered by the electrical energy storage device.

4. The optically powered media converter of claim 1, further comprising a microcontroller electrically connected to the PIN detector.

5. The optically powered media converter of claim 1, wherein the photovoltaic detector comprises a photodiode.

6. The optically powered media converter of claim 1, wherein the electrical data output is electrically connected to an electrical data interface.

7. The optically powered media converter of claim 5, wherein the electrical data interface comprises an unshielded twisted pair electrical interface.

8. The optically powered media converter of claim 1, wherein the optical receiver comprises an optical splitter.

9. The optically powered media converter of claim 1, wherein the optical splitter is configured to split an optical signal received at the optical signal input connection onto the optical data output connection and the optical power output connection.

10. The optically powered media converter of claim 1, further comprising a temperature sensor.

11. An optically powered media converter comprising:
    an optical receiver including an optical signal input connection, an optical data output connection, and an optical power output connection;
    a photodiode optically connected to the optical data output connection of the optical receiver and including an electrical data output;
    a transmitter including an electrical signal connection and an optical data transmission output;
    a photovoltaic cell connected to the optical power output connection;
    a charge pump electrically connected to the photovoltaic cell; and
    an electrical energy storage device electrically connected to the charge pump,
    wherein the electrical data interface comprises an unshielded twisted pair electrical interface.

12. An optically powered media converter comprising:
    an optical splitter including an optical signal input connection, an optical data output connection, and an optical power output connection;
    a photovoltaic detector optically connected to the optical data output connection of the optical receiver and including an electrical data output;
    a transmitter including an electrical signal connection and an optical data transmission output;
    a photovoltaic cell connected to the optical power output connection;
    a charge pump electrically connected to the photovoltaic cell; and
    an electrical energy storage device electrically connected to the charge pump.

13. The optically powered media converter of claim 12, wherein the optical splitter is configured to split an optical signal received at the optical signal input connection onto the optical data output connection and the optical power output connection.

* * * * *